US012792838B2

(12) United States Patent
Adhikary et al.

(10) Patent No.: US 12,792,838 B2
(45) Date of Patent: Nov. 10, 2026

(54) PLANNING PHASE AND GENERATION PHASE FOR GENERATIVE ARTIFICIAL INTELLIGENCE

(71) Applicant: Salesforce, Inc., San Francisco, CA (US)

(72) Inventors: Paras Adhikary, San Francisco, CA (US); Simone Mainardi, Dublin (IE)

(73) Assignee: Salesforce, Inc., San Francisco, CA (US)

( * ) Notice: Subject to any disclaimer, the term of this patent is extended or adjusted under 35 U.S.C. 154(b) by 263 days.

(21) Appl. No.: 18/636,966

(22) Filed: Apr. 16, 2024

(65) Prior Publication Data

US 2025/0322171 A1 Oct. 16, 2025

(51) Int. Cl.

| | |
|---|---|
| ***G06F 40/30*** | (2020.01) |
| ***G06F 21/54*** | (2013.01) |
| ***G06N 3/02*** | (2006.01) |
| ***G06N 3/045*** | (2023.01) |
| ***G06N 20/00*** | (2019.01) |

(52) U.S. Cl.
CPC .............. *G06F 40/30* (2020.01); *G06F 21/54* (2013.01); *G06N 3/02* (2013.01); *G06N 3/045* (2023.01); *G06N 20/00* (2019.01)

(58) Field of Classification Search
CPC .......... G06N 3/045; G06N 3/02; G06N 20/00; G06N 3/04; G06F 40/30
See application file for complete search history.

(56) References Cited

U.S. PATENT DOCUMENTS

| | | | | |
|---|---|---|---|---|
| 10,978,056 | B1 | 4/2021 | Challa et al. | |
| 11,836,595 | B1* | 12/2023 | Yang | G06N 3/082 |
| 2018/0189628 | A1* | 7/2018 | Kaufmann | G06F 40/30 |
| 2021/0117434 | A1* | 4/2021 | Coke | G06F 16/335 |
| 2024/0354346 | A1* | 10/2024 | Lott | G06F 16/9027 |
| 2024/0394471 | A1* | 11/2024 | Kotikalapudi | G06F 40/20 |

(Continued)

FOREIGN PATENT DOCUMENTS

WO 2017/180286 A1 10/2017

OTHER PUBLICATIONS

Jiang et al., "LIm-blender: Ensembling large language models with pairwise ranking and generative fusion." Proceedings of the 61st Annual Meeting of the Association for Computational Linguistics (vol. 1: Long Papers). (Year: 2023).*

(Continued)

*Primary Examiner* — Samuel G Neway
(74) *Attorney, Agent, or Firm* — Holland & Hart, LLP.

(57) ABSTRACT

A system may receive a natural language description of a desired output to be generated by one or more artificial intelligence (AI) models. The system may generate, using at least one of the AI models and based on the natural language description, multiple generation plans, each containing a first set of instructions for generating the desired output. The system may rank these generation plans using at least one of the AI models to select a potential generation plan. The system may generate, using at least one of the AI models and following the instructions in the selected plan, multiple outputs. The system may rank these outputs using at least one of the AI models to select a potential output. The system may validate the selected output based on validation parameters associated with the desired output.

20 Claims, 9 Drawing Sheets

(56) References Cited

U.S. PATENT DOCUMENTS

| | | | | |
|---|---|---|---|---|
| 2024/0394965 | A1* | 11/2024 | Doggett | G06N 20/00 |
| 2024/0420239 | A1* | 12/2024 | Chen | G06Q 40/06 |
| 2025/0165463 | A1* | 5/2025 | Brenner | G06F 16/242 |
| 2025/0322171 | A1* | 10/2025 | Adhikary | G06F 40/30 |

OTHER PUBLICATIONS

"International Search Report and Written Opinion of the International Searching Authority," issued in connection with 1 Int'l Appl. No. PCT/US2025/024768, dated Jul. 1, 2025 (13 pages).

* cited by examiner

PLANNING PHASE AND GENERATION PHASE FOR GENERATIVE ARTIFICIAL INTELLIGENCE

FIELD OF TECHNOLOGY

The present disclosure relates generally to database systems and data processing, and more specifically to planning phase and generation phase for generative artificial intelligence.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, the cloud platform, a server, or other device may use generative artificial intelligence (AI) models to generate a requested output. However, such methods may be improved.

DETAILED DESCRIPTION

Figure 1:
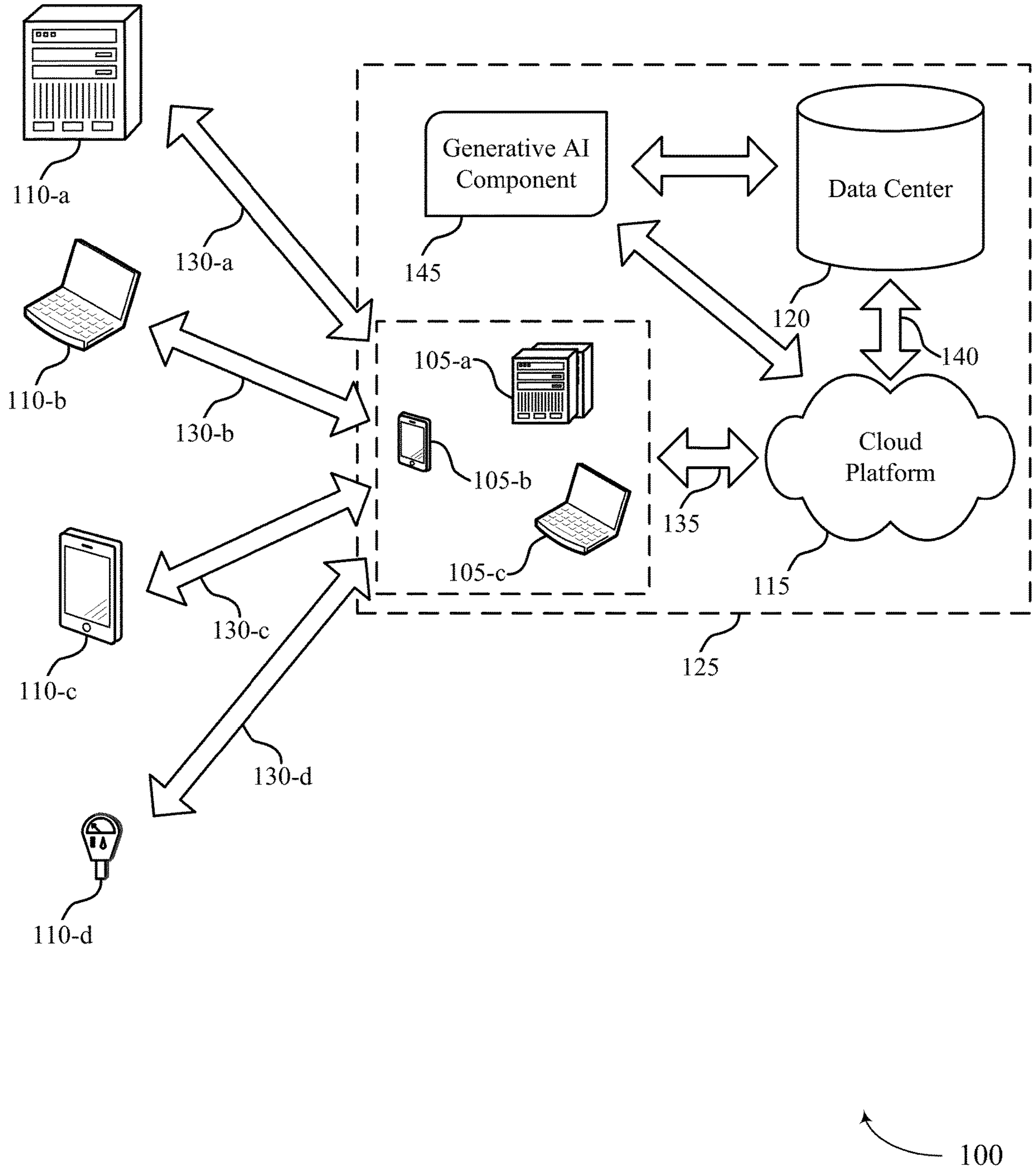
FIG. 1 illustrates an example of a method for producing generative artificial intelligence (AI) output using one or more generative AI models system that supports planning phase and generation phase for generative artificial intelligence in accordance with examples as disclosed herein.

Though the use of generative artificial intelligence (GAI) technology has become more wide-spread, there are still many problems faced by users and administrators that could be improved by leveraging GAI. For example, users are increasingly utilizing external cloud substrates or cloud platforms to perform various tasks. These users often employ tools, processes, software, or operations to improve or customize use of the particular cloud substrate, resulting in strong "lock-in" to that cloud substrate. As such, transition between or use of multiple cloud substrates becomes difficult, creating risks such as over-reliance on a particular cloud substrate that may lead to reduced security, efficiency, capability, and resource utilization, among other deficiencies. In another example, code developed by programmers may be subjected to testing before deployment in production environments. However, in such approaches, testing may be incomplete, only reaching a portion of the entire deployed code base, leading to increased errors, security issues, information leakage, and reduced processing efficiency, among other deficiencies.

The techniques described herein may involve the use of GAI to generate outputs (e.g., security policies for operation of multiple cloud substrates, code generation, or other scenarios in which a user may employ GAI). For example, a two-phase approach may be used that employs the GAI's ability to describe step-by-step reasoning in a generation plan that the GAI may employ for the actual generation of the desired output.

A first phase for an example implementation regarding security policies may involve a planning phase in which a natural language input describing a desired security policy is fed to a GAI with instructions to produce a generation plan. The GAI (or multiple GAIs) may generate a group of generation plans that are again passed to one or more GAIs to be ranked by the GAIs (e.g., according to criteria or parameters provided to the GAIs) to produce one or more candidate plans that may form a basis for the second phase of the process.

A second phase for an example implementation regarding security policies may be an iterative process in which one or more of the generation plans selected by the ranking process of the first phase are passed to one or more GAIs for generation of candidate security policies. The candidate security policies are then validated multiple times (e.g., for correct syntax, applicability or correctness for a particular cloud substrate, or according to other criteria). If the validation fails, the failing output and a description of the failure may be passed to the GAIs once again to produce another iteration of candidate outputs (e.g., to account for the errors produced in the previous round). This iterative process may continue until all validation steps are successful and a valid, functioning output (e.g., policy or other code) is produced. In some examples, such as security policy generation, this second phase may be repeated for the different cloud substrates for which security policies are to be generated.

In at least these ways, deployment of cloud substrates and development of code (as two examples) may be performed with increased security compliance, policy enforcement, scalability, and resource management while reducing costs and deployment times. Though the example of security policies is used here, the two-phase approach may be applied to many different scenarios involving GAI (e.g., code generation and unit testing). Aspects of the disclosure are initially described in the context of an environment supporting an on-demand database service. Aspects of the disclosure are then described with reference to a processing system, generative AI schemes, and a process flow. Aspects of the disclosure are further illustrated by and described with reference to apparatus diagrams, system diagrams, and flowcharts that relate to planning phase and generation phase for generative artificial intelligence.

FIG. 1 illustrates an example of a system 100 for cloud computing that supports planning phase and generation phase for generative artificial intelligence in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to some applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

Additionally, or alternatively, the system 100 may support the use of a large language model (generative AI model), such as the generative AI component 145. In some examples, a generative AI component 145 may also be referred to as any of an artificial intelligence (AI), a generative AI (GAI), a GAI model, a large language model (LLM). The generative AI component 145 may be a model that is trained on a corpus of input data, which may include text, images, video, audio, structured data, or any combination thereof. Such data may represent general-purpose data, domain-specific data, or any combination thereof. Further, a generative AI component 145 may be supplemented with additional training on data associated with a role, function, or generation outcome to further specialize the generative AI component 145 and increase the accuracy and relevance of information generated with the generative AI component 145.

In some examples, the cloud platform 115 may receive a query from a cloud client 105 that may include a request to produce a response (e.g., text, images, video, audio, or other information) to the query using the generative AI component 145. The cloud platform 115 may transmit a prompt to the generative AI component 145 that includes the query (or information included therein) and receive the generated output (e.g., text, images, video, audio, or other information) that is responsive to the prompt. In some examples, the cloud platform 115 may modify or supplement one or more aspects of the query to increase the quality of the response. In some examples, such modification or supplementation may be referred to as grounding.

The system 100 may support any configuration for the use of generative AI models. In FIG. 1, the generative AI component 145 is depicted as being located outside of the subsystem 125. However, the generative AI component 145 may be hosted on the cloud platform 115, elsewhere within the subsystem 125, or outside the subsystem 125 (e.g., a publicly-hosted platform). Additionally, or alternatively, multiple generative AI components 145 may be employed to perform one or more of the actions described as being performed by a single generative AI component 145. Further, in some examples, the generative AI component 145 may communicate with one or more other elements, such as a contact 110, the data center 120, one or more other elements, or any combination thereof, to receive additional information (e.g., that may be indicated in the query or the prompt) that is to be considered for performing generative processes.

For example, a cloud client 105 may communicate with the cloud platform 115 to request that the generative AI component 145 generate a requested output (e.g., a policy to be implemented on a cloud substrate, a unit test for service code, or another desired output). The cloud platform 115 and the generative AI component 145 may perform a planning phase in which multiple plans for producing the requested output are generated and ranked by the generative AI component 145. The highest-ranking plan may then be fed to the generative AI component 145 to guide the generative AI component 145 in generating multiple outputs, which are also ranked to determine a highest-ranking output. This highest-ranking output may be validated one or more times, after which the output may be returned or indicated to the cloud client 105.

Users and administrators of processing systems face many problems that could be improved through the use of generative AI. However, in current approaches, generative AI models often suffer from poor logical reasoning, due at least in part to many options or branches that the generative AI might explore. Further, existing generative AI models do not include any inherent planning capability, due to the focus on a "next-token" approach in which a first token leads to a second and so on. Such deficiencies may result in hallucination or other errors in outputs.

The subject matter described herein may improve the performance and accuracy of generative AI systems. For example, splitting a processing job into phases (e.g., through the use of plan generation and using a plan for generation operations) can enhance the AI's logical reasoning capabilities by reducing the quantity of logical problems it needs to solve simultaneously. This approach can lead to more accurate output. Further, ranking the various generated plans (which may differ due to the nature of generative AI) may improve logical reasoning of the generative AI model and result in more precise output. Further, as generative AI models may lack an inherent planning capability, a plan that provides context grounding and a step-by-step structure for generating the policy may both reduce the quantity of logical problems to be solved at once and also provide more accurate output.

For example, a user may provide a natural language description of a requested output to be generated by the AI models. The AI models then generate multiple generation plans based on this description, each plan including a series of instructions for generating the requested output. The AI models then rank these generation plans to select a candidate generation plan. Following the instructions contained in the chosen plan, the AI models generate a variety of outputs. These outputs are subsequently ranked by the AI models to select a candidate output. Finally, the system validates the chosen output in accordance with one or more validation parameters associated with the requested output. This method ensures that the AI system generates the most suitable output based on the user's initial request, and that the output meets validation criteria (e.g., specified by an administrator).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
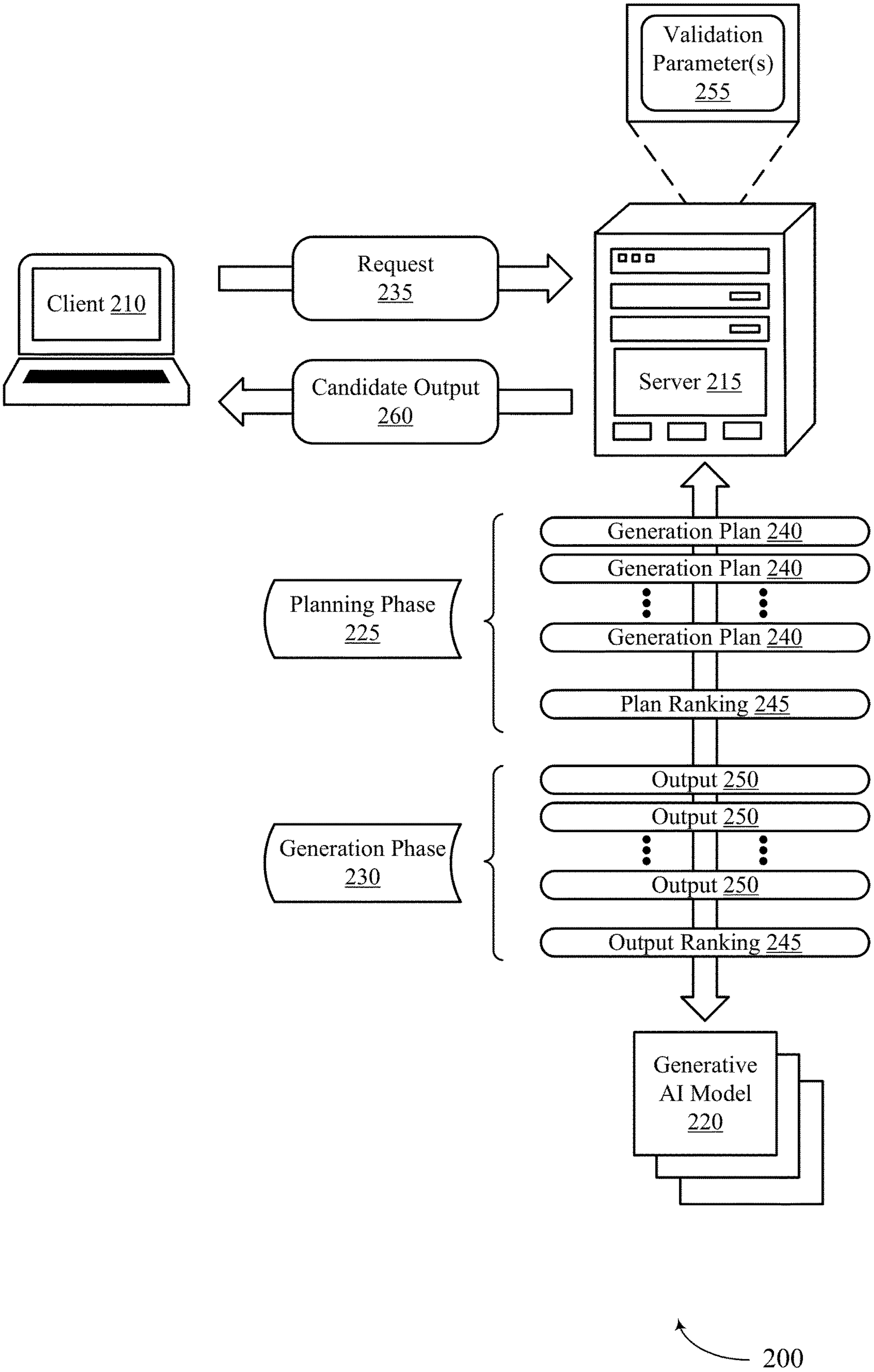
FIG. 2 shows an example of a processing system that supports planning phase and generation phase for generative artificial intelligence in accordance with examples as disclosed herein.

FIG. 2 shows an example of a wireless communications system 200 that supports planning phase and generation phase for generative artificial intelligence in accordance with examples as disclosed herein.

The processing system 200 may include a client 210, a server 215, and a generative AI model 220. The server 215 may represent a single server or processing entity, multiple servers or processing entities, a complete processing system, or any other entity capable of performing the operations described herein. The generative AI model 220 may be included as part of or otherwise associated with the server 215 or may operate independently of the server 215.

Presently, individuals and companies are increasingly utilizing generative AI, and generative AI approaches may be applied to many different problems. However, as described herein, current approaches to generative AI may be improved, as such approaches often result in hallucinations or other errors that are not accurate or helpful. The subject matter described herein may increase accuracy and relevance of outputs produced by generative AI models.

The subject matter herein may be applied to various different contexts or use cases. Examples provided herein demonstrate the applicability of the subject matter across different contexts. Though some examples contexts are provided, the subject matter described herein may be applied to a variety of contexts.

For example, such improved generative AI techniques may be used in the context of cloud computing. Companies and individuals are increasingly utilizing cloud computing on cloud substrates. As such, a significant amount of companies and individuals across different sectors are strategically planning and executing cloud transition strategies. Such transitions have significant advantages but also come with drawbacks. One of the drawbacks is the creation of a strong coupling (e.g., lock-in) between the business and the cloud substrate providers. This coupling becomes more notable when the strategy fails to account for multiple substrates. As a result, some services may be tightly coupled (e.g., up to the level of code) to a cloud substrate provider. For example, code bases and documentation may contain hard references to a provider's application programming interfaces (APIs) and tools. This strong coupling is a risk for the business that cannot freely move to other vendors, lose negotiation power, and end up in increased inertia and risk.

The techniques described herein leverage the use of a generative AI model 220 or multiple such generative AI models 220 to support such cloud transitions though the use of policy generation for cloud substrates, including multi-substrate resource provisioning, management, compliance, security, one or more other policies, or any combination thereof. The use of such policies generated by generative AI models 220 may reduce or eliminate the use of separate implementations on different substrates with the consequent reduction of development costs associated with platform-specific code. Deployment may be accelerated by speeding up deployment cycles by providing standardized, ready-to-use provisioning code, thereby enhancing overall project timelines. Risks may be reduced by loosening the dependency on any substrate provider and casing the seamless migration across different providers.

For example, the processing system 200 may employe a two-phase technique that leverages the capability of the generative AI model 220 to state the step by step reasoning to generate policies for (or any other output). Allowing the generative AI model 220 to perform singular tasks in series improves its logical reasoning, leading to a precise policy generation. By generating multiple solutions and ranking them, resulting outputs from the generative AI model 220 are improved.

For example, a client 210 may transmit a request 235 to the server 215, which may include a natural language description of a desired output to be produced by the generative AI model 220. Such an output may be text, video, audio, images, or any other output that may be generated by the generative AI model 220. The server 215 and the generative AI model 220 may then coordinate the multiple phases to generate the output.

A first phase may be referred to as a planning phase 225, in which the generative AI model 220 may generate a generation plan 240 or multiple such generation plans 240. Such a generation plan 240 may include or indicate steps, operations, instructions, or information for generating the output requested in the request 235. The generative AI model 220 may generate multiple such generation plans 240, as each generation plan 240 may be different (e.g., due to being generated at different times, with different input, considering previously-generated generation plans 240 or using different generative AI models 220). These multiple generation plans 240 may be ranked by the generative AI model 220 to produce a plan ranking 245 which may indicate a hierarchy or ranking of the multiple generation plans 240. In some examples, the generative AI model 220 may rank the plans based on one or more ranking parameters or criteria.

A second phase may be referred to as a generation phase 230, in which the generative AI model 220 may generate an output 250 or multiple such outputs 250 based on the most highly ranked generation plan 240 (or other generation plan 240 selected based on one or more criteria, such as the plan ranking 245). In the generation phase 230, the outputs 250 may generated to allow for variation between the outputs 250 to increase the changes that one or more of the outputs 250 will be appropriate or align with the request 235. The multiple outputs 250 may be ranked by the generative AI model 220 to generate the output ranking 245. The ranking 245 may indicate a hierarchy or ranking of the multiple outputs 250 to aid in determining a candidate output that may undergo further processing.

The server 215 may validate (e.g., via one or more validation steps or processes) the highest-ranked (or otherwise selection output 250) in accordance with the validation parameters 255. The validation parameters 255 may include or indicate one or more rules, processes, considerations, or information to which the selected output 250 may be compared and validated. For example, the output 250 may be validated to see whether the output 250 conforms with the request 235 or syntax rules (e.g., for policy generation or unit testing). In at least these ways, the processing system 200 may generate the candidate output 260, which may be a selected, validated output 250 that is responsive to the request 235. The validation parameters 255 may be more accurate that outputs generated in other approaches, due to the generation, evaluation, and ranking of multiple generation plans 240 and multiple outputs 250.

Figure 3:
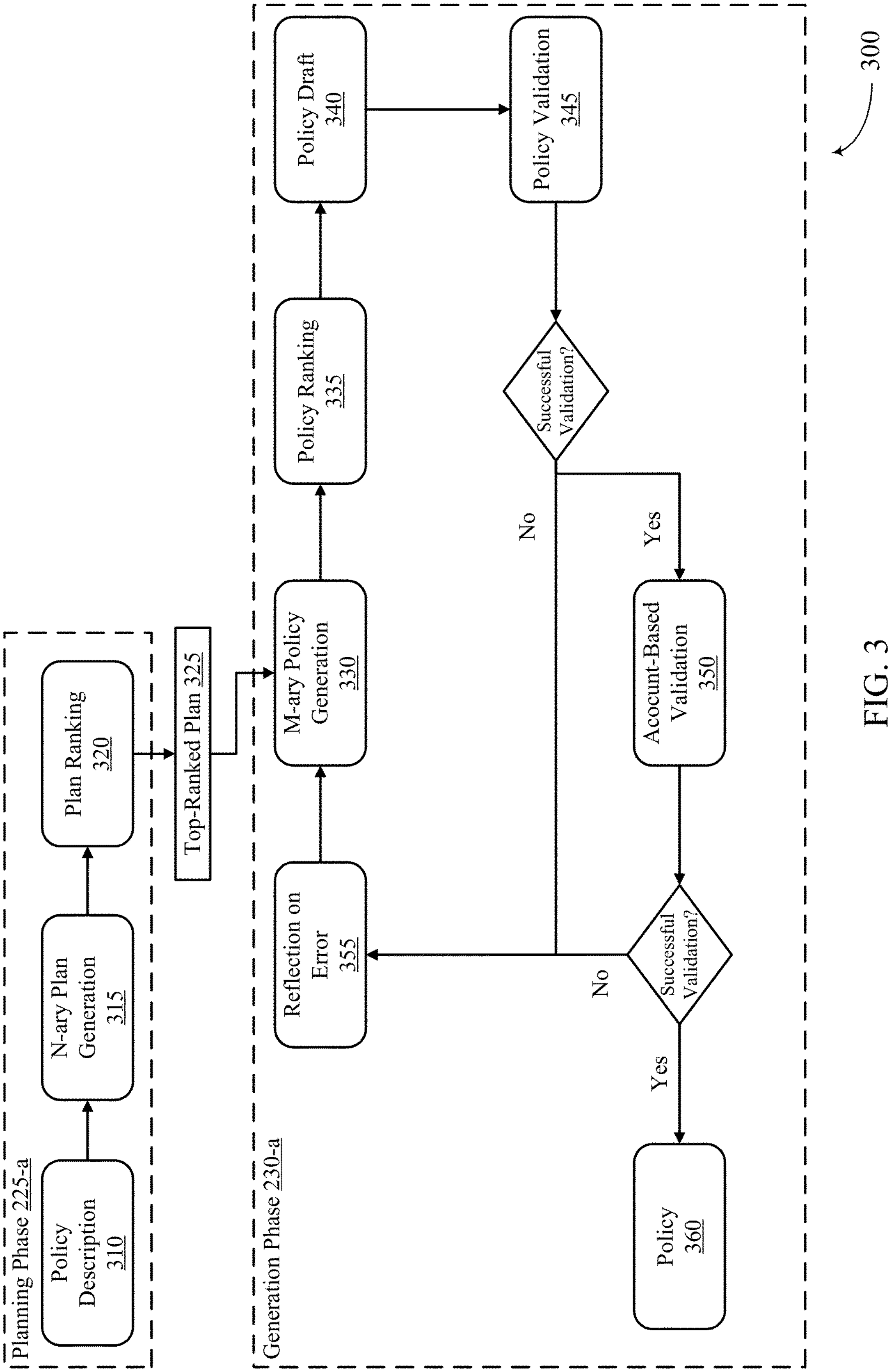
FIG. 3 shows an example of a generative AI scheme that supports planning phase and generation phase for generative artificial intelligence in accordance with examples as disclosed herein.

FIG. 3 shows an example of a generative AI scheme 300 that supports planning phase and generation phase for generative artificial intelligence in accordance with examples as disclosed herein. As described herein, the techniques described herein (including those described in the generative AI scheme 300) include a planning phase 225-*a* and a generation phase 230-*a*. The generative AI scheme 300 describes examples associated with generation of a policy (e.g., a security policy) associated with a cloud substrate.

In the planning phase 225-*a*, a generation plan may be generated by the generative AI model to aid the generative AI model in following logical steps to produce a more accurate final output. For example, in the planning phase 225-*a*, the generative AI model may receive a prompt that may include the policy description 310. The policy description 310 may include a natural language description of a policy that is the desired final output of the generative AI scheme 300. Such a prompt may include one or more additional instructions to guide the generative AI model in generating the generation plans. An example prompt for generating three policy generation plans policy is shown below. In the example, the natural language description 310 may be inserted into the prompt in place of the {description} tag. The prompt may further include an output format for presenting the generation plans.

```
Construct 3 plans with steps to write a {cloud-provider} cloud custodian
policy that meets the requirements in the description and utilize the
remediation steps as supplemental information, think step by step:
description: {description}
remediation steps: {remediation}
Conclude with each plan formatted like this:
Plan 1: <title 1>
----------
<plan 1 steps>
----------
Plan 2: <title 2>
----------
<plan 2 steps>
----------
Plan 3: <title 3>
----------
<plan 3 steps>
----------
```

At 315, the generative AI model may generate a quantity of generation plans in accordance with the prompt. For example, the generative AI model may engage in "N-ary" plan generation, in which the generative AI model may generate a quantity of generation plans represented by N. The generative AI model may employ the information provided in the prompt, including the policy description 310, to generate N different plans. By generating N solutions, a variety of techniques or approaches may be employed in the different solutions so that the plan ranking 320 may be performed to select the best one or more plans to be used. Such a generation plan may appear as shown here (using an example of generating a policy for as cloud substrate):

Create a cloud custodian policy to append a bucket policy to every bucket with a policy statement called DenyPublicObjectACL to prevent any object in these buckets from being set to public-read, public-read-write, or authenticated-read.

At the plan ranking 320, the generative AI model may rank the N different solutions and may output the top-ranked plan 325. Though the selected solution may be referred to as a top-ranked plan 325, various criteria may be employed to select such a solution or plan that is to be used and passed to the generation phase 230-*a*.

In some examples, to perform the plan ranking 320, a system may transmit a prompt to a generative AI model that includes instructions for ranking the generation plans that were generated by the generative AI model. The ranking prompt may include information including a description of the ranking task, a scoring system that is to be used, criteria for different scores within the scoring system, one or more instructions for review, one or more desired output formats, or any combination thereof. Such a prompt may appear as shown in the example prompt below.

Task: Evaluate the response to a user's question based on the detailed 5-point scoring system provided below. Your task involves both scoring and justifying the score based on how well the response meets each criterion.

Scoring System:

Relevance (1 point): The response must be on-topic and provide information that is somewhat related to the user's question.

Addressing the Query (1 point): It should cover a significant part of the user's inquiry, even if it doesn't fully resolve the question.

Usefulness (1 point): The response answers the basic question in a manner that is practically helpful to the user.

Perspective and Organization (1 point): The response should directly address the query in a well-organized and helpful manner. Minor issues in clarity or focus are acceptable.

Expert Tailoring (1 point): The response perfectly fits the user's needs, showcasing expert knowledge without irrelevant information, and is engaging and insightful.

Instruction for Review:

Given a user's instruction and the corresponding response, critically assess how the response adheres to each of the criteria above. Provide a brief justification (up to 100 words) for the score, highlighting key points of strength and areas for improvement.

```
Format:
User's Question: {instruction}
Response: {response}
Evaluation: [Provide your justification and score here]
Conclude with your total score in the format:
----------
Score: <total points>
----------
```

The top-ranked plan 325 may be then provided to the generative AI model for the generation phase 230-*a*. In the generation phase 230-*a*, multiple outputs (e.g., policies) may be generated through following the generation plan outlined in the top-ranked plan 325.

At the M-ary policy generation 330, the generative AI model may use the top-ranked plan 325 received from the planning phase 225-*a* to generate M policies. Each policy may represent a solution (e.g., a policy tailored for a cloud substrate that implements actions for such a cloud substrate) for the top-ranked plan 325. By generating such multiple M policies, the generation phase 230-*a* allows for variations so that a highest-ranked policy may can be selected. In some examples, a prompt may be transmitted to the generative AI model with the instruction to create the policy as well as a description of the generation plan. Such a prompt may be as shown below:

Create a {cloud-provider} cloud custodian policy that meets the requirements in the description and utilize the plan for supplemental information, think step by step:

```
description: {description}
plan: {plan}
Conclude with the final cloud custodian policy formatted like this:
Policy:
----------
<cloud custodian policy>
----------
```

At the policy ranking 335, the generative AI model may rank the M policies and outputs the highest-ranked or otherwise selected policy or output as the policy draft 340 to be passed to the policy validation 345. Similar to the plan ranking 320, at the policy ranking 335, a system may transmit a prompt to a generative AI model that includes instructions for ranking the M outputs or policies plans that were generated by the generative AI model. Such a prompt may be similar to the prompt described herein in association with the plan ranking 320, but may be used in the context of the policy ranking 335 (e.g., the prompt may include instructions to rank the M policies or outputs in accordance with the ranking instructions therein).

At the policy validation 345, the policy draft 340 may be validated in accordance with one or more validation parameters, such as static checks, syntax checks, attribute checks, one or more other elements associated with the policy, or any combination thereof. If the validation is not successful, at the reflection on error 355, a prompt may be transmitted to the generative AI model instructing the generative AI model to analyze the policy draft 340 and one or more validation errors or events to produce one or more additional corrected policies. In response to receiving the prompt, the generative AI model may engage once again in the M-ary policy generation 330 (e.g., performing a second iteration of the M-ary policy generation 330), but with the additional information generated in response to the unsuccessful policy validation 345. Such an iterative process may continue until one or more solutions pass the policy validation 345, the account-based validation 350, or both. Such a prompt provided in association with the reflection on error 355 may be as follows:

Given this cloud custodian validation error, how can we fix the policy, think step by step:

```
Error: {error}
Failed Policy:
{policy}
Conclude with the fixed cloud custodian policy formatted like this:
Policy:
----------
<cloud custodian policy>
----------
```

In response to the policy validation 345 being successful, the policy draft 340 may be passed to the account-based validation 350. In the account-based validation 350, the policy draft 340 may be compared with or run on a cloud substrate to determine whether the resources and operations indicated by the policy are functional with the cloud substrate or whether the policy correctly implements the policy description 310 on the cloud substrate.

If the account-based validation 350 is not successful, at the reflection on error 355, a prompt (e.g., similar to the prompt transmitted in response to an unsuccessful policy validation 345) may be transmitted to the generative AI model instructing the generative AI model to analyze the policy draft 340 and one or more validation errors or events (e.g., those produced in association with an unsuccessful account-based validation 350) to produce one or more additional corrected policies. In response to receiving the prompt, the generative AI model may engage once again in the M-ary policy generation 330, but with the additional information generated in response to the unsuccessful account-based validation 350.

However, if the account-based validation 350 is successful, the policy draft 340, having passed both the policy validation 345 and the account-based validation 350, may be indicated as the policy 360, which may be transmitted or indicated to the user or client that provided the policy description 310. In some examples, such a policy 360 (and in some cases, the policy draft 340) may include various elements, including a name or identifier, a resource or cloud substrate on which the policy is to be implemented, a description of the policy, one or more actions that are to be implemented or performed at the cloud substrate, or any combination thereof. For example, such a policy 360 may be as follows:

```
policies:
 - name: append-s3-bucket-policy
  resource: aws.s3
  description: |
    Appends a policy statement to every S3 bucket to prevent objects
    from being set to public-read, public-read-write, or
    authenticated-read.
  actions:
   - type: modify-bucket-policy
     statement:
       Sid: DenyS3PublicObjectACL
       Effect: Deny
       Principal: "*"
       Action:
         - s3: PutObjectAcl
       Resource: "*"
       Condition:
         StringEquals:
           s3:x-amz-acl: "public-read"
```

In some examples, the generation phase 230-*a* may include generation of an output or policy for multiple cloud substrates. For example, the planning phase 225-*a* and generation phase 230-*a* may involve the N-ary plan generation 315 to generate multiple generation plans for multiple cloud substrates and the M-ary policy generation 330 that may generate multiple policies for multiple cloud substrates.

Additionally, or alternatively, in response to successfully generating a policy 360 for a first cloud substrate, both the planning phase 225-*a* and the generation phase 230-*a* may be performed to iterate and generate another policy for a second cloud substrate based on the successfully generated and validated policy 360 associated with the first cloud substrate. For example, at the planning phase 225-*a*, the initial prompt to the generative AI model may include the successfully generated and validated policy 360 in place of the policy description 310, such that the N-ary plan generation 315 may be performed based on the policy 360 in accordance with an instruction that the generative AI model generate the generation plans based on the policy 360 or convert the policy 360 for use for the second cloud substrate. Similarly, the multiple outputs or policies generated in the generation phase 230-*a* are based on the top-ranked plan 325 for generating a policy for the second cloud substrate. For example, a policy for a second cloud substrate generated based on the example policy 360 discussed herein may be as follows:

```
policies:
  - name: append-azure-blob-storage-policy
    resource: azure.blobstorage-container
    description: |
      Appends a policy statement to every Azure Blob Storage
      container to prevent objects from being set to public access.
    actions:
      - type: set-container-policy
        deny_public_access: true
```

By generating and implementing such policies, security compliance may be increased. Policies may be configured to enforce compliance with internal policies and external regulations. For example, such policies may automatically detect and remediate non-compliant resources, such as storage without encryption or logging, compute instances without proper security groups, or other policies that grant excessive permissions. Governance and policy enforcement may be increased, as such policies may implement governance rules and policies as code, making it easier to enforce those policies across all cloud substrate resources more consistently. This is particularly useful for large-scale environments where manual governance and compliance checks are impractical. Automated remediation may be employed, as a system that detects a violation of a policy, corrective actions may be taken automatically, such as resizing an instance, encrypting a storage volume, or isolating a compromised resource. Resource management may be improved, as the management of resources may be automated by applying tags, deleting or disabling unneeded resources, or stopping compute instances during low activity periods. High scalability may be achieved, as policies may be automatically generated as more compliance rules are desired and implemented. A cost to serve may be reduced, as separate implementations for different cloud substrates may be generated efficiently and accurately, reducing development costs. Development may be streamlined by generating uniform provisioning code, saving valuable developer time and effort. Improved resource allocation may be achieved, as efficient allocation of resources across diverse substrates may be promoted, improving usage and reducing unnecessary expenses. Development cycles may be accelerated by providing standardized, ready-to-use provisioning code, enhancing overall timelines.

Figure 4:
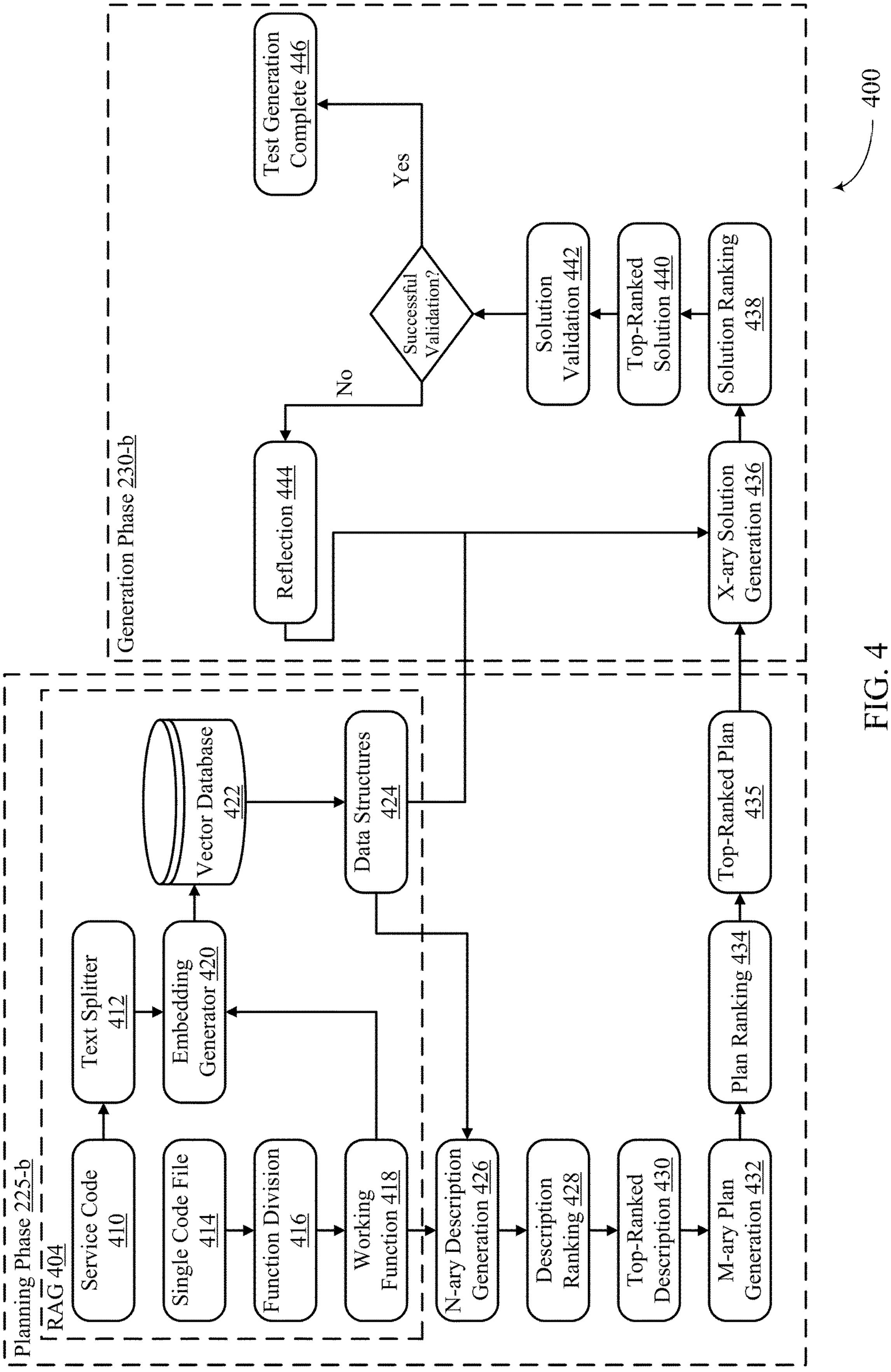
FIG. 4 shows an example of a generative AI scheme that supports planning phase and generation phase for generative artificial intelligence in accordance with examples as disclosed herein.

FIG. 4 shows an example of a generative AI scheme 400 that supports planning phase and generation phase for generative artificial intelligence in accordance with examples as disclosed herein. Many of the operations and elements described herein are similar to other operations and elements described in the context of other examples. As such, the description and discussion of the other operations and elements in the context of other examples is equally applicable to the examples described here.

The generative AI scheme 400 may depict an example of test code generation by iteration. For example, the techniques described herein may be applied to generation of unit tests for service code. This may allow for quick addition of unit tests to old or unmaintained code bases, increased code coverage on production services, promoting a higher degree of confidence in the reliability and stability of the service, increased maintainability and flexibility, increased capacity for evolution over time without regression, reduced risk associated with deploying new features or updates, and increased documentation, demonstrating how the code is supposed to work.

For example, in a planning phase 225-*b* and the generation phase 230-*b*, a system may employ a test generation process that may iterate over multiple coding files and run such tests over a test suite.

For example, in a planning phase 225-*b*, retrieval augmentation and generation (RAG) 404 may be employed, which may utilize an embedding generator 420 and a vector database 422 to store service code for quick reference. For example, service code 410 may be passed through a text splitter 412 and fed to the embedding generator 420, which may store the embeddings in the vector database 422. Additionally, or alternatively, a single code file 414 may be processed with a function division 416 to generate one or more working functions 418, which may be passed to the embedding generator 420. Such an approach may allow a generative AI model to ground coding solutions by providing relevant data structures 424, interfaces, and functions.

Based on such relevant data structures 424 and working functions 418, the generative AI model may perform the N-ary description generation 426 in which the generative AI model uses the function information and other relevant code to generate N different natural language descriptions. A variety of different generated descriptions may promote variations of natural language descriptions of code solutions so that the generated descriptions may be passed through the description ranking 428 to determine or select a top-ranked description 430.

At the M-ary plan generation 432, the generative AI model may generate M different natural language plans for generating code solutions. These plans then are passed through the plan ranking 434 to determine or select a top-ranked plan 435.

In the generation phase 230-*b*, the top-ranked plan 435 may be used as a basis for the generative AI model to generate multiple code solutions at the X-ary solution generation 436. The resulting multiple code solutions may be passed to the solution ranking 438 to determine or select a top-ranked solution 440. The top ranked solution 440 may then be subjected to one or more validation operations at the solution validation 442. For example, as described herein, such validation may include static checks, syntax checks, attribute checks, dependency checks, one or more other validation operations, or any combination thereof.

If the solution validation 442 is not successful, at the reflection 444, the generative AI model may be prompted to analyze the top-ranked solution 440, one or more errors or events generated as a result of the unsuccessful validation, and one or more instructions to generated one or more revised solutions based on the top-ranked solution 440 and the one or more errors or events (e.g., via a second iteration of the X-ary solution generation 436). Such an iterative process may continue until one or more solutions pass the solution validation 442.

In response to the solution validation 442 being successful, at 446, the test generation may be complete, having produced a validated code solution that may be employed for unit testing.

Figure 5:
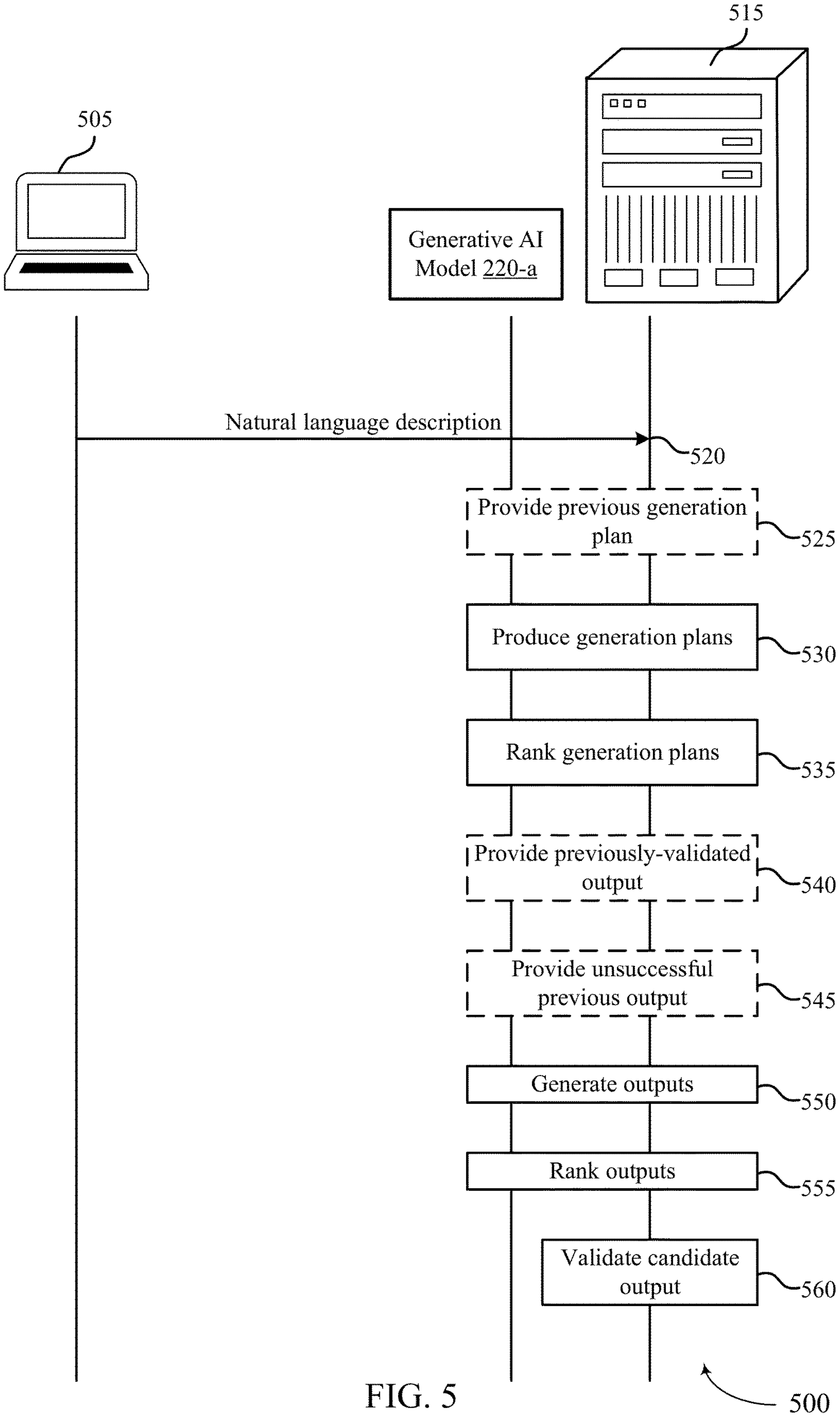
FIG. 5 shows an example of a process flow that supports planning phase and generation phase for generative artificial intelligence in accordance with examples as disclosed herein.

FIG. 5 shows an example of a process flow 500 that supports planning phase and generation phase for generative artificial intelligence in accordance with examples as disclosed herein. The process flow 500 may implement various aspects of the present disclosure described herein. The elements described in the process flow 500 (e.g., application server 515, generative AI model 220-*a*, and client 505) may be examples of similarly named elements described herein.

In the following description of the process flow 500, the operations between the various entities or elements may be performed in different orders or at different times. Some operations may also be left out of the process flow 500, or other operations may be added. Although the various entities or elements are shown performing the operations of the process flow 500, some aspects of some operations may also be performed by other entities or elements of the process flow 500 or by entities or elements that are not depicted in the process flow, or any combination thereof.

At 520, the application server 515 may receive (e.g., from the client 505) a natural language description of a requested output to be generated by the one or more generative AI models 220-*a*. In some examples, the requested output may include a requested cloud substrate security policy. In some examples, the requested output may include requested unit test code.

At 525, the application server 515 may provide a previous successful generation plan to the one or more generative AI models 220-*a*.

At 530, the application server 515 may generate, with at least one of the one or more generative AI models 220-*a* and based on the natural language description, a plurality of generation plans, each generation plan that may include a first plurality of instructions for generating the requested output. In some examples, each generation plan of the plurality of generation plans includes natural language instructions for generating the plurality of outputs, context information for generating the plurality of outputs, machine instructions for generating the plurality of outputs, or any combination thereof. In some examples, to generate the plurality of generation plans, the application server 515 may provide, to the one or more generative AI models 220-*a*, a natural language request to generate a second plurality of instructions for generating each generation plan and a requested output format for the plurality of generation plans. In some examples, generating the plurality of generation plans is based on a consensus of the one or more generative AI models 220-*a*.

At 535, the application server 515 may rank, with at least one of the one or more generative AI models 220-*a*, the plurality of generation plans to select a candidate generation plan from the plurality of generation plans. In some examples, to rank the plurality of generation plans to select the candidate generation plan, the application server 515 may provide, to the one or more generative AI models 220-*a*, a ranking request that may include an indication of a ranking system based on one or more ranking criteria, a natural language request to rank the plurality of generation plans and provide reasoning for one or more generated rankings, and a request output format for presenting generated rankings.

At 540, the application server 515 may provide a previously-validated candidate output to the one or more generative AI models 220-*a*.

At 545, the application server 515 may provide an unsuccessfully-validated output and an indication of an error associated with the unsuccessfully-validated output to the one or more generative AI models 220-*a*.

At 550, the application server 515 may generate, with at least one of the one or more generative AI models 220-*a* and in accordance with the first plurality of instructions comprised in the candidate generation plan, a plurality of outputs. In some examples, generating the plurality of outputs is based on a consensus of the one or more generative AI models 220-*a*.

At 555, the application server 515 may rank, with at least one of the one or more generative AI models 220-*a*, the plurality of outputs to select a candidate output from the plurality of outputs. In some examples, to rank the plurality of outputs to selection the candidate output, the application server 515 may provide, to the one or more generative AI models 220-*a*, a ranking request that may include an indication of a ranking system based on one or more ranking criteria, a natural language request to rank the plurality of outputs and provide reasoning for one or more generated rankings, and a requested output format for presenting generated rankings. In some examples, the candidate output may include a cloud substrate security policy. In some examples, the candidate output may include unit test code.

At 560, the application server 515 may validate the candidate output in accordance with one or more validation parameters associated with the requested output.

Figure 6:
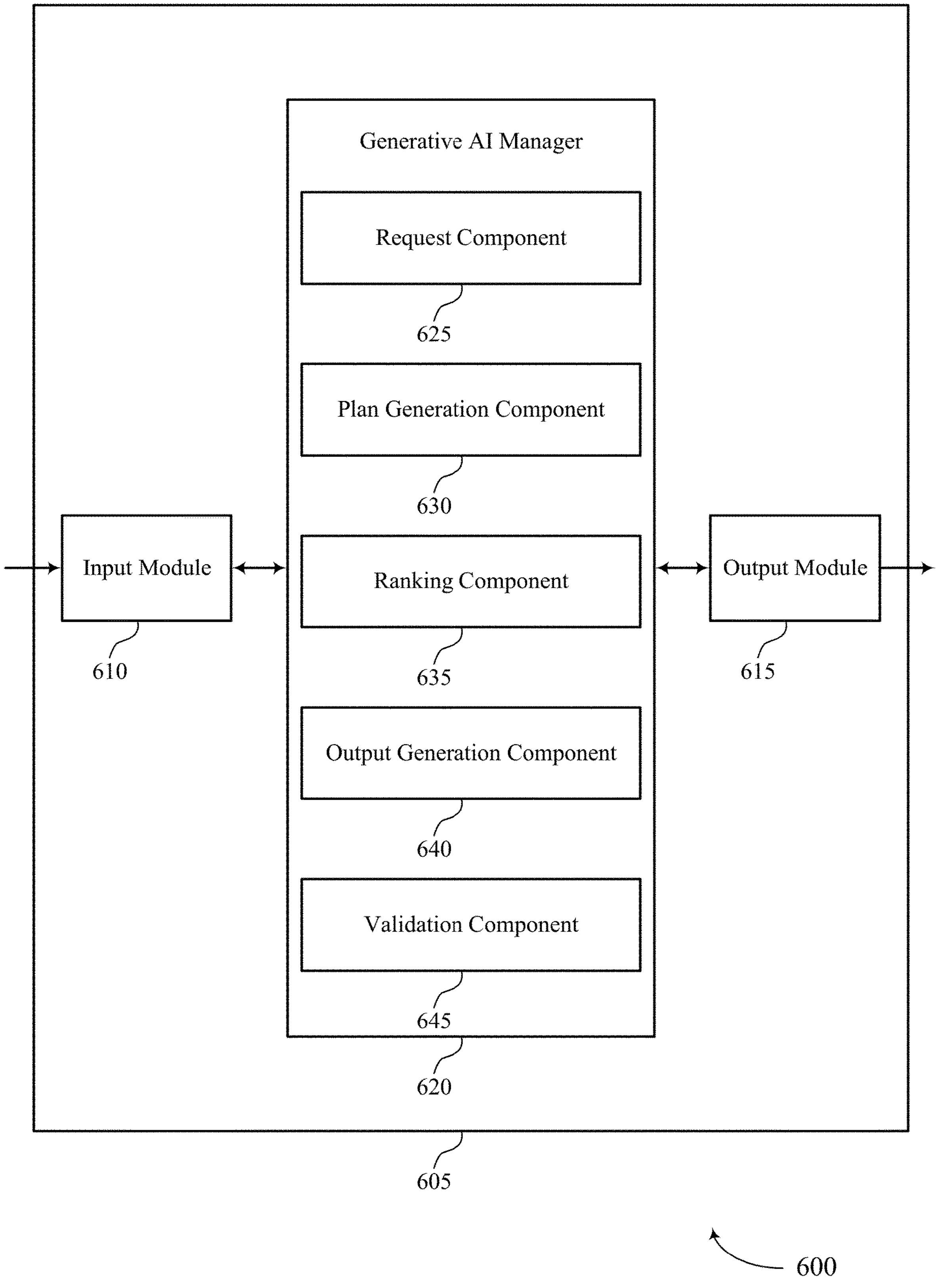
FIG. 6 shows a block diagram of an apparatus that supports planning phase and generation phase for generative artificial intelligence in accordance with examples as disclosed herein.

FIG. 6 shows a block diagram 600 of a device 605 that supports planning phase and generation phase for generative artificial intelligence in accordance with examples as disclosed herein. The device 605 may include an input module 610, an output module 615, and a generative AI manager 620. The device 605, or one or more components of the device 605 (e.g., the input module 610, the output module 615, the generative AI manager 620), may include at least one processor, which may be coupled with at least one memory, to support the described techniques. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the generative AI manager 620 to support planning phase and generation phase for generative artificial intelligence. In some cases, the input module 610 may be a component of an input/output (I/O) controller 810 as described with reference to FIG. 8.

The output module 615 may manage output signals for the device 605. For example, the output module 615 may receive signals from other components of the device 605, such as the generative AI manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the generative AI manager 620 may include a request component 625, a plan generation component 630, a ranking component 635, an output generation component 640, a validation component 645, or any combination thereof. In some examples, the generative AI manager 620, or various components thereof, may be configured to perform various operations (e.g., receiving, monitoring, transmitting) using or otherwise in cooperation with the input module 610, the output module 615, or both. For example, the generative AI manager 620 may receive information from the input module 610, send information to the output module 615, or be integrated in combination with the input module 610, the output module 615, or both to receive information, transmit information, or perform various other operations as described herein.

The generative AI manager 620 may support producing generative artificial intelligence (AI) output using one or more generative AI models in accordance with examples as disclosed herein. The request component 625 may be configured to support receiving a natural language description of a requested output to be generated by the one or more generative AI models. The plan generation component 630 may be configured to support generating, with at least one of the one or more generative AI models and based on the natural language description, a set of multiple generation plans, each generation plan including a first set of multiple instructions for generating the requested output. The ranking component 635 may be configured to support ranking, with at least one of the one or more generative AI models, the set of multiple generation plans to select a candidate generation plan from the set of multiple generation plans. The output generation component 640 may be configured to support generating, with at least one of the one or more generative AI models and in accordance with the first set of multiple instructions included in the candidate generation plan, a set of multiple outputs. The ranking component 635 may be configured to support ranking, with at least one of the one or more generative AI models, the set of multiple outputs to select a candidate output from the set of multiple outputs. The validation component 645 may be configured to support validating the candidate output in accordance with one or more validation parameters associated with the requested output.

Figure 7:
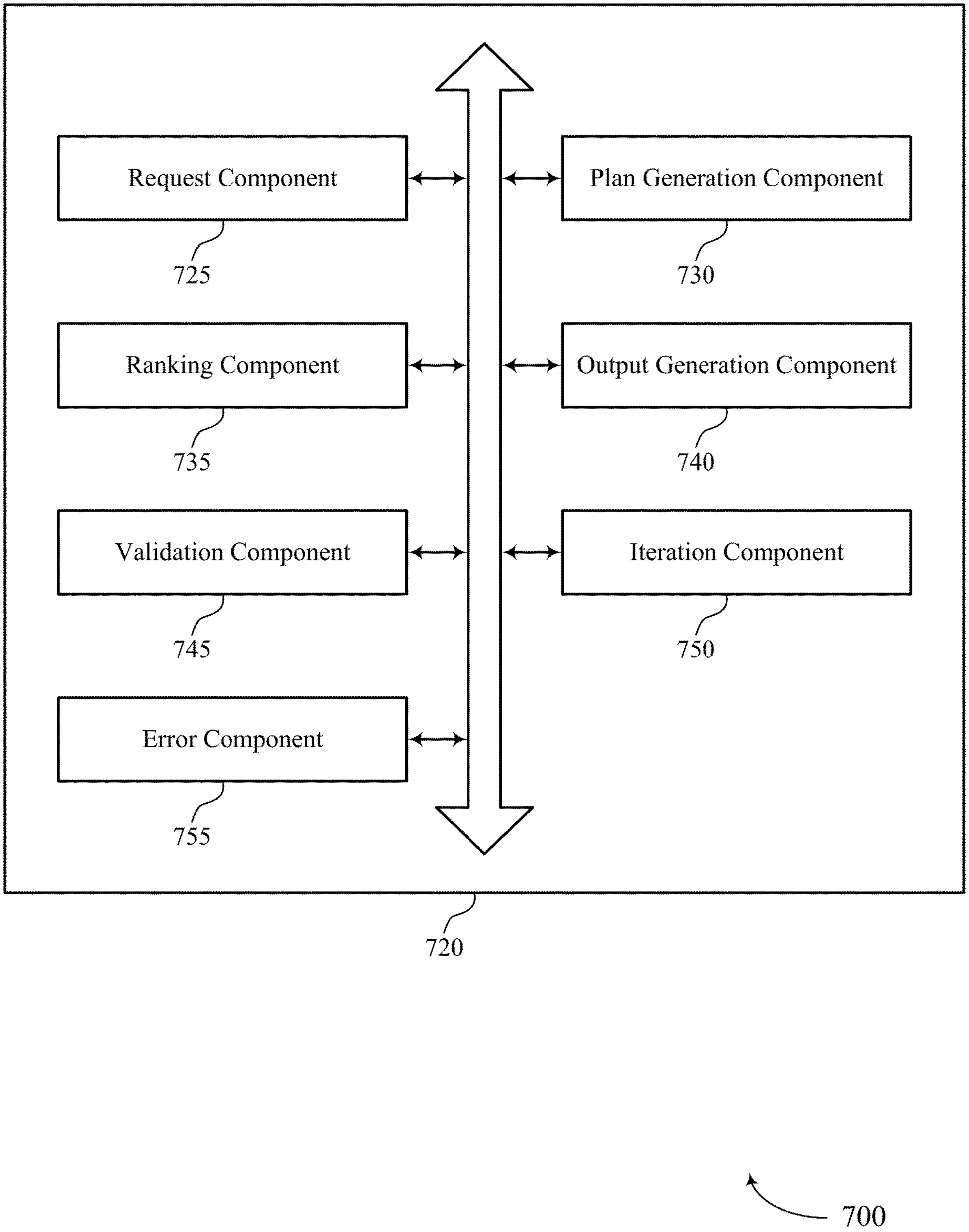
FIG. 7 shows a block diagram of a generative AI manager that supports planning phase and generation phase for generative artificial intelligence in accordance with examples as disclosed herein.

FIG. 7 shows a block diagram 700 of a generative AI manager 720 that supports planning phase and generation phase for generative artificial intelligence in accordance with examples as disclosed herein. The generative AI manager 720 may be an example of aspects of a generative AI manager or a generative AI manager 620, or both, as described herein. The generative AI manager 720, or various components thereof, may be an example of means for performing various aspects of planning phase and generation phase for generative artificial intelligence as described herein. For example, the generative AI manager 720 may include a request component 725, a plan generation component 730, a ranking component 735, an output generation component 740, a validation component 745, an iteration component 750, an error component 755, or any combination thereof. Each of these components, or components of subcomponents thereof (e.g., one or more processors, one or more memories), may communicate, directly or indirectly, with one another (e.g., via one or more buses).

The generative AI manager 720 may support producing generative artificial intelligence (AI) output using one or more generative AI models in accordance with examples as disclosed herein. The request component 725 may be configured to support receiving a natural language description of a requested output to be generated by the one or more generative AI models. The plan generation component 730 may be configured to support generating, with at least one of the one or more generative AI models and based on the natural language description, a set of multiple generation plans, each generation plan including a first set of multiple instructions for generating the requested output. The ranking component 735 may be configured to support ranking, with at least one of the one or more generative AI models, the set of multiple generation plans to select a candidate generation plan from the set of multiple generation plans. The output generation component 740 may be configured to support generating, with at least one of the one or more generative AI models and in accordance with the first set of multiple instructions included in the candidate generation plan, a set of multiple outputs. In some examples, the ranking component 735 may be configured to support ranking, with at least one of the one or more generative AI models, the set of multiple outputs to select a candidate output from the set of multiple outputs. The validation component 745 may be configured to support validating the candidate output in accordance with one or more validation parameters associated with the requested output.

In some examples, to support generating the set of multiple outputs, the iteration component 750 may be configured to support providing a previous successful generation plan, a previously-validated candidate output, or both to the one or more generative AI models.

In some examples, to support generating the set of multiple outputs, the error component 755 may be configured to support providing an unsuccessfully-validated output and an indication of an error associated with the unsuccessfully-validated output to the one or more generative AI models.

In some examples, each generation plan of the set of multiple generation plans includes natural language instructions for generating the set of multiple outputs, context information for generating the set of multiple outputs, machine instructions for generating the set of multiple outputs, or any combination thereof.

In some examples, to support ranking the set of multiple generation plans to select the candidate generation plan, the ranking component 735 may be configured to support providing, to the one or more generative AI models, a ranking request including an indication of a ranking system based on one or more ranking criteria, a natural language request to rank the set of multiple generation plans and provide reasoning for one or more generated rankings, and a request output format for presenting generated rankings.

In some examples, to support set of multiple outputs to select the candidate output, the ranking component 735 may be configured to support providing, to the one or more generative AI models, a ranking request including an indication of a ranking system based on one or more ranking criteria, a natural language request to rank the set of multiple outputs and provide reasoning for one or more generated rankings, and a requested output format for presenting generated rankings.

In some examples, to support generating the set of multiple generation plans, the plan generation component 730 may be configured to support providing, to the one or more generative AI models, a natural language request to generate a second set of multiple instructions for generating each generation plan and a requested output format for the set of multiple generation plans.

In some examples, generating the set of multiple generation plans is based on a consensus of the one or more generative AI models. In some examples, generating the set of multiple outputs is based on a consensus of the one or more generative AI models.

In some examples, the requested output includes a requested cloud substrate security policy. In some examples, the candidate output includes a cloud substrate security policy.

In some examples, the requested output includes requested unit test code. In some examples, the candidate output includes unit test code.

Figure 8:
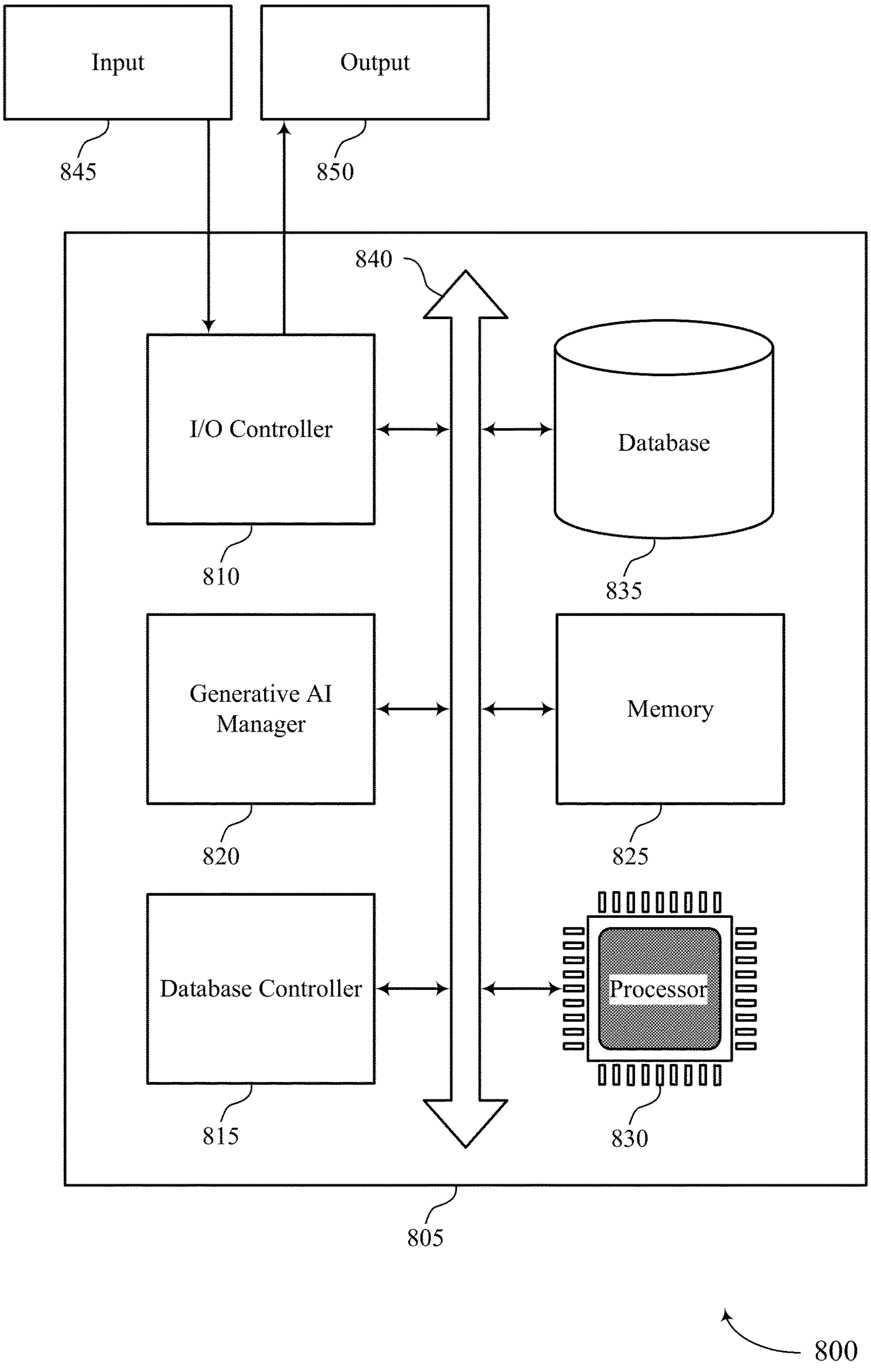
FIG. 8 shows a diagram of a system including a device that supports planning phase and generation phase for generative artificial intelligence in accordance with examples as disclosed herein.

FIG. 8 shows a diagram of a system 800 including a device 805 that supports planning phase and generation phase for generative artificial intelligence in accordance with examples as disclosed herein. The device 805 may be an example of or include components of a device 605 as described herein. The device 805 may include components for bi-directional data communications including components for transmitting and receiving communications, such as a generative AI manager 820, an I/O controller, such as an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS) which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting planning phase and generation phase for generative artificial intelligence). The processor 830 may be an example of a single processor or multiple processors. For example, the device 805 may include one or more processors 830.

The generative AI manager 820 may support producing generative artificial intelligence (AI) output using one or more generative AI models in accordance with examples as disclosed herein. For example, the generative AI manager 820 may be configured to support receiving a natural language description of a requested output to be generated by the one or more generative AI models. The generative AI manager 820 may be configured to support generating, with at least one of the one or more generative AI models and based on the natural language description, a set of multiple generation plans, each generation plan including a first set of multiple instructions for generating the requested output. The generative AI manager 820 may be configured to support ranking, with at least one of the one or more generative AI models, the set of multiple generation plans to select a candidate generation plan from the set of multiple generation plans. The generative AI manager 820 may be configured to support generating, with at least one of the one or more generative AI models and in accordance with the first set of multiple instructions included in the candidate generation plan, a set of multiple outputs. The generative AI manager 820 may be configured to support ranking, with at least one of the one or more generative AI models, the set of multiple outputs to select a candidate output from the set of multiple outputs. The generative AI manager 820 may be configured to support validating the candidate output in accordance with one or more validation parameters associated with the requested output.

By including or configuring the generative AI manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 9:
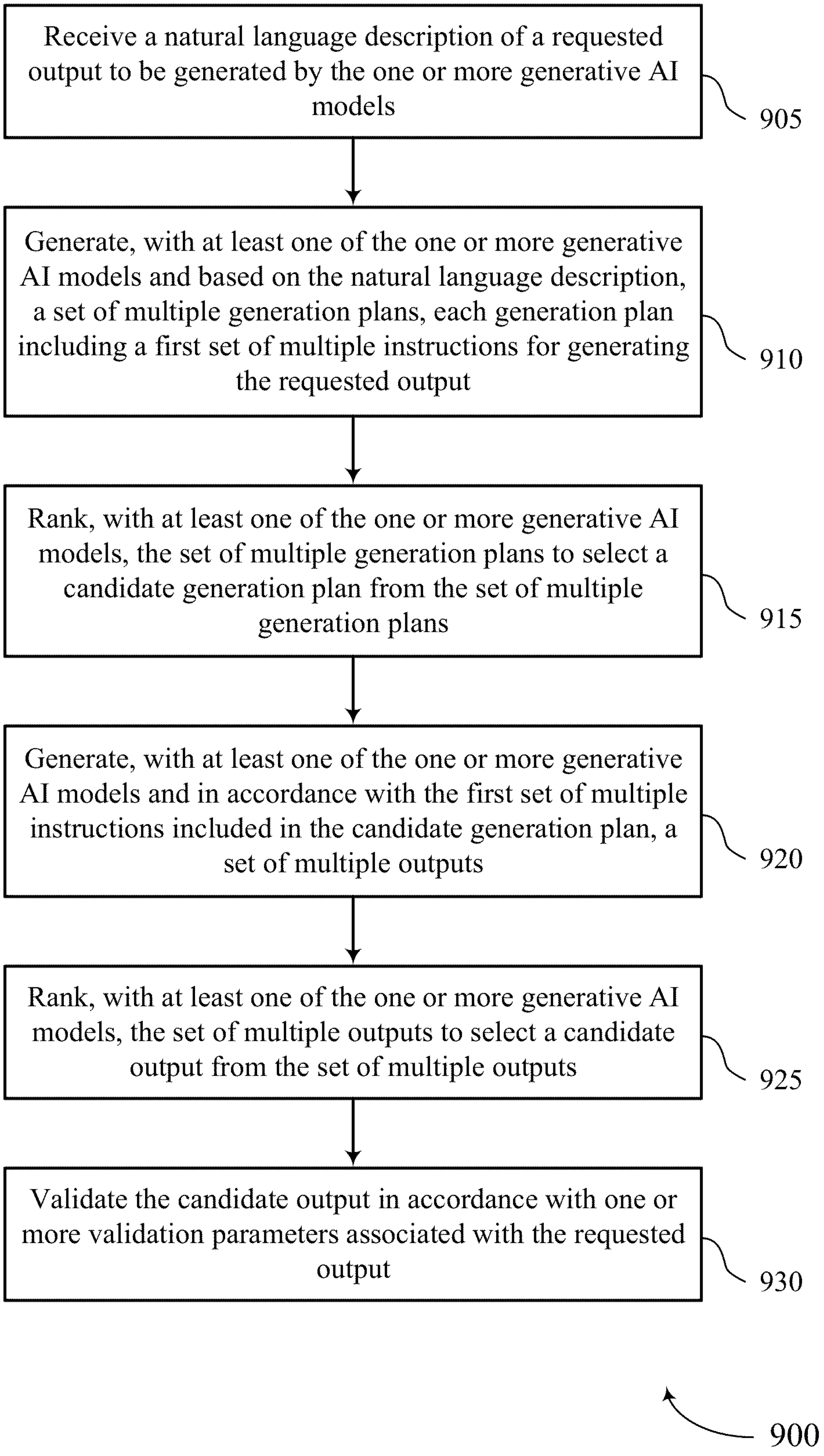
FIG. 9 shows a flowchart illustrating methods that support planning phase and generation phase for generative artificial intelligence in accordance with examples as disclosed herein.

FIG. 9 shows a flowchart illustrating a method 900 that supports planning phase and generation phase for generative artificial intelligence in accordance with examples as disclosed herein. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally, or alternatively, the application server may perform aspects of the described functions using special-purpose hardware.

At 905, the method may include receiving a natural language description of a requested output to be generated by the one or more generative AI models. The operations of 905 may be performed in accordance with examples as disclosed herein. In some examples, aspects of the operations of 905 may be performed by a request component 725 as described with reference to FIG. 7.

At 910, the method may include generating, with at least one of the one or more generative AI models and based on the natural language description, a set of multiple generation plans, each generation plan including a first set of multiple instructions for generating the requested output. The operations of 910 may be performed in accordance with examples as disclosed herein. In some examples, aspects of the operations of 910 may be performed by a plan generation component 730 as described with reference to FIG. 7.

At 915, the method may include ranking, with at least one of the one or more generative AI models, the set of multiple generation plans to select a candidate generation plan from the set of multiple generation plans. The operations of 915 may be performed in accordance with examples as disclosed herein. In some examples, aspects of the operations of 915 may be performed by a ranking component 735 as described with reference to FIG. 7.

At 920, the method may include generating, with at least one of the one or more generative AI models and in accordance with the first set of multiple instructions included in the candidate generation plan, a set of multiple outputs. The operations of 920 may be performed in accordance with examples as disclosed herein. In some examples, aspects of the operations of 920 may be performed by an output generation component 740 as described with reference to FIG. 7.

At 925, the method may include ranking, with at least one of the one or more generative AI models, the set of multiple outputs to select a candidate output from the set of multiple outputs. The operations of 925 may be performed in accordance with examples as disclosed herein. In some examples, aspects of the operations of 925 may be performed by a ranking component 735 as described with reference to FIG. 7.

At 930, the method may include validating the candidate output in accordance with one or more validation parameters associated with the requested output. The operations of 930 may be performed in accordance with examples as disclosed herein. In some examples, aspects of the operations of 930 may be performed by a validation component 745 as described with reference to FIG. 7.

A method for producing generative artificial intelligence (AI) output using one or more generative AI models by an apparatus is described. The method may include receiving a natural language description of a requested output to be generated by the one or more generative AI models, generating, with at least one of the one or more generative AI models and based on the natural language description, a set of multiple generation plans, each generation plan including a first set of multiple instructions for generating the requested output, ranking, with at least one of the one or more generative AI models, the set of multiple generation plans to select a candidate generation plan from the set of multiple generation plans, generating, with at least one of the one or more generative AI models and in accordance with the first set of multiple instructions included in the candidate generation plan, a set of multiple outputs, ranking, with at least one of the one or more generative AI models, the set of multiple outputs to select a candidate output from the set of multiple outputs, and validating the candidate output in accordance with one or more validation parameters associated with the requested output.

An apparatus for producing generative artificial intelligence (AI) output using one or more generative AI models is described. The apparatus may include one or more memories storing processor executable code, and one or more processors coupled with the one or more memories. The one or more processors may individually or collectively be operable to execute the code to cause the apparatus to receive a natural language description of a requested output to be generated by the one or more generative AI models, generate, with at least one of the one or more generative AI models and based on the natural language description, a set of multiple generation plans, each generation plan including a first set of multiple instructions for generating the requested output, rank, with at least one of the one or more generative AI models, the set of multiple generation plans to select a candidate generation plan from the set of multiple generation plans, generate, with at least one of the one or more generative AI models and in accordance with the first set of multiple instructions included in the candidate generation plan, a set of multiple outputs, rank, with at least one of the one or more generative AI models, the set of multiple outputs to select a candidate output from the set of multiple outputs, and validate the candidate output in accordance with one or more validation parameters associated with the requested output.

Another apparatus for producing generative artificial intelligence (AI) output using one or more generative AI models is described. The apparatus may include means for receiving a natural language description of a requested output to be generated by the one or more generative AI models, means for generating, with at least one of the one or more generative AI models and based on the natural language description, a set of multiple generation plans, each generation plan including a first set of multiple instructions for generating the requested output, means for ranking, with at least one of the one or more generative AI models, the set of multiple generation plans to select a candidate generation plan from the set of multiple generation plans, means for generating, with at least one of the one or more generative AI models and in accordance with the first set of multiple instructions included in the candidate generation plan, a set of multiple outputs, means for ranking, with at least one of the one or more generative AI models, the set of multiple outputs to select a candidate output from the set of multiple outputs, and means for validating the candidate output in accordance with one or more validation parameters associated with the requested output.

A non-transitory computer-readable medium storing code for producing generative artificial intelligence (AI) output using one or more generative AI models is described. The code may include instructions executable by one or more processors to receive a natural language description of a requested output to be generated by the one or more generative AI models, generate, with at least one of the one or more generative AI models and based on the natural language description, a set of multiple generation plans, each generation plan including a first set of multiple instructions for generating the requested output, rank, with at least one of the one or more generative AI models, the set of multiple generation plans to select a candidate generation plan from the set of multiple generation plans, generate, with at least one of the one or more generative AI models and in accordance with the first set of multiple instructions included in the candidate generation plan, a set of multiple outputs, rank, with at least one of the one or more generative AI models, the set of multiple outputs to select a candidate output from the set of multiple outputs, and validate the candidate output in accordance with one or more validation parameters associated with the requested output.

In some examples of the method, apparatus, and non-transitory computer-readable medium described herein, generating the set of multiple outputs may include operations, features, means, or instructions for providing a previous successful generation plan, a previously-validated candidate output, or both to the one or more generative AI models.

In some examples of the method, apparatus, and non-transitory computer-readable medium described herein, generating the set of multiple outputs may include operations, features, means, or instructions for providing an unsuccessfully-validated output and an indication of an error associated with the unsuccessfully-validated output to the one or more generative AI models.

In some examples of the method, apparatus, and non-transitory computer-readable medium described herein, each generation plan of the set of multiple generation plans includes natural language instructions for generating the set of multiple outputs, context information for generating the set of multiple outputs, machine instructions for generating the set of multiple outputs, or any combination thereof.

In some examples of the method, apparatus, and non-transitory computer-readable medium described herein, ranking the set of multiple generation plans to select the candidate generation plan may include operations, features, means, or instructions for providing, to the one or more generative AI models, a ranking request including an indication of a ranking system based on one or more ranking criteria, a natural language request to rank the set of multiple generation plans and provide reasoning for one or more generated rankings, and a request output format for presenting generated rankings.

In some examples of the method, apparatus, and non-transitory computer-readable medium described herein, the set of multiple outputs to select the candidate output may include operations, features, means, or instructions for providing, to the one or more generative AI models, a ranking request including an indication of a ranking system based on one or more ranking criteria, a natural language request to rank the set of multiple outputs and provide reasoning for one or more generated rankings, and a requested output format for presenting generated rankings.

In some examples of the method, apparatus, and non-transitory computer-readable medium described herein, generating the set of multiple generation plans may include operations, features, means, or instructions for providing, to the one or more generative AI models, a natural language request to generate a second set of multiple instructions for generating each generation plan and a requested output format for the set of multiple generation plans.

Some examples of the method, apparatus, and non-transitory computer-readable medium described herein may further include operations, features, means, or instructions for generating the set of multiple generation plans may be based on a consensus of the one or more generative AI models and generating the set of multiple outputs may be based on a consensus of the one or more generative AI models.

In some examples of the method, apparatus, and non-transitory computer-readable medium described herein, the requested output includes a requested cloud substrate security policy and the candidate output includes a cloud substrate security policy.

In some examples of the method, apparatus, and non-transitory computer-readable medium described herein, the requested output includes requested unit test code and the candidate output includes unit test code.

The following provides an overview of aspects of the present disclosure:

Aspect 1: A method for producing generative artificial intelligence (AI) output using one or more generative AI models, the method comprising: receiving a natural language description of a requested output to be generated by the one or more generative AI models; generating, with at least one of the one or more generative AI models and based at least in part on the natural language description, a plurality of generation plans, each generation plan comprising a first plurality of instructions for generating the requested output; ranking, with at least one of the one or more generative AI models, the plurality of generation plans to select a candidate generation plan from the plurality of generation plans; generating, with at least one of the one or more generative AI models and in accordance with the first plurality of instructions comprised in the candidate generation plan, a plurality of outputs; ranking, with at least one of the one or more generative AI models, the plurality of outputs to select a candidate output from the plurality of outputs; and validating the candidate output in accordance with one or more validation parameters associated with the requested output.

Aspect 2: The method of aspect 1, wherein generating the plurality of outputs further comprises: providing a previous successful generation plan, a previously-validated candidate output, or both to the one or more generative AI models.

Aspect 3: The method of any of aspects 1 through 2, wherein generating the plurality of outputs comprises: providing an unsuccessfully-validated output and an indication of an error associated with the unsuccessfully-validated output to the one or more generative AI models.

Aspect 4: The method of any of aspects 1 through 3, wherein each generation plan of the plurality of generation plans comprises natural language instructions for generating the plurality of outputs, context information for generating the plurality of outputs, machine instructions for generating the plurality of outputs, or any combination thereof.

Aspect 5: The method of any of aspects 1 through 4, wherein ranking the plurality of generation plans to select the candidate generation plan comprises: providing, to the one or more generative AI models, a ranking request comprising an indication of a ranking system based at least in part on one or more ranking criteria, a natural language request to rank the plurality of generation plans and provide reasoning for one or more generated rankings, and a request output format for presenting generated rankings.

Aspect 6: The method of any of aspects 1 through 5, wherein the plurality of outputs to select the candidate output comprises: providing, to the one or more generative AI models, a ranking request comprising an indication of a ranking system based at least in part on one or more ranking criteria, a natural language request to rank the plurality of outputs and provide reasoning for one or more generated rankings, and a requested output format for presenting generated rankings.

Aspect 7: The method of any of aspects 1 through 6, wherein generating the plurality of generation plans comprises: providing, to the one or more generative AI models, a natural language request to generate a second plurality of instructions for generating each generation plan and a requested output format for the plurality of generation plans.

Aspect 8: The method of any of aspects 1 through 7, wherein generating the plurality of generation plans is based at least in part on a consensus of the one or more generative AI models; and generating the plurality of outputs is based at least in part on a consensus of the one or more generative AI models.

Aspect 9: The method of any of aspects 1 through 8, wherein the requested output comprises a requested cloud substrate security policy; and the candidate output comprises a cloud substrate security policy.

Aspect 10: The method of any of aspects 1 through 9, wherein the requested output comprises requested unit test code; and the candidate output comprises unit test code.

Aspect 11: An apparatus for producing generative artificial intelligence (AI) output using one or more generative AI models, comprising one or more memories storing processor-executable code, and one or more processors coupled with the one or more memories and individually or collectively operable to execute the code to cause the apparatus to perform a method of any of aspects 1 through 10.

Aspect 12: An apparatus for producing generative artificial intelligence (AI) output using one or more generative AI models, comprising at least one means for performing a method of any of aspects 1 through 10.

Aspect 13: A non-transitory computer-readable medium storing code for producing generative artificial intelligence (AI) output using one or more generative AI models, the code comprising instructions executable by one or more processors to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article “a” may be understood to mean “one or more components,” and referring to “the component” subsequently in the claims may be understood to be equivalent to referring to “at least one of the one or more components.” Similarly, subsequent reference to a component introduced as “one or more components” using the terms “the” or “said” may refer to any or all of the one or more components. For example, referring to “the one or more components” subsequently in the claims may be understood to be equivalent to referring to “at least one of the one or more components.”

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for producing generative artificial intelligence (AI) output using one or more generative AI models, the method comprising:

receiving a natural language description of a requested output to be generated by the one or more generative AI models;

generating, with at least one of the one or more generative AI models and based at least in part on the natural language description, a plurality of generation plans, each generation plan comprising a first plurality of instructions for generating the requested output;

ranking, with at least one of the one or more generative AI models, the plurality of generation plans to select a candidate generation plan from the plurality of generation plans;

generating, with at least one of the one or more generative AI models and in accordance with the first plurality of instructions comprised in the candidate generation plan, a plurality of outputs;

ranking, with at least one of the one or more generative AI models, the plurality of outputs to select a candidate output from the plurality of outputs; and validating the candidate output in accordance with one or more validation parameters associated with the requested output.

2. The method of claim 1, wherein generating the plurality of outputs further comprises:

providing a previous successful generation plan, a previously-validated candidate output, or both to the one or more generative AI models.

3. The method of claim 1, wherein generating the plurality of outputs comprises:

providing an unsuccessfully-validated output and an indication of an error associated with the unsuccessfully-validated output to the one or more generative AI models.

4. The method of claim 1, wherein each generation plan of the plurality of generation plans comprises natural language instructions for generating the plurality of outputs, context information for generating the plurality of outputs, machine instructions for generating the plurality of outputs, or any combination thereof.

5. The method of claim 1, wherein ranking the plurality of generation plans to select the candidate generation plan comprises:

providing, to the one or more generative AI models, a ranking request comprising an indication of a ranking system based at least in part on one or more ranking criteria, a natural language request to rank the plurality of generation plans and provide reasoning for one or more generated rankings, and a request output format for presenting generated rankings.

6. The method of claim 1, wherein ranking the plurality of outputs to select the candidate output comprises:

providing, to the one or more generative AI models, a ranking request comprising an indication of a ranking system based at least in part on one or more ranking criteria, a natural language request to rank the plurality of outputs and provide reasoning for one or more generated rankings, and a requested output format for presenting generated rankings.

7. The method of claim 1, wherein generating the plurality of generation plans comprises:

providing, to the one or more generative AI models, a natural language request to generate a second plurality of instructions for generating each generation plan and a requested output format for the plurality of generation plans.

8. The method of claim 1, wherein:

generating the plurality of generation plans is based at least in part on a consensus of the one or more generative AI models; and generating the plurality of outputs is based at least in part on a consensus of the one or more generative AI models.

9. The method of claim 1, wherein:

the requested output comprises a requested cloud substrate security policy; and the candidate output comprises a cloud substrate security policy.

10. The method of claim 1, wherein:

the requested output comprises requested unit test code; and the candidate output comprises unit test code.

11. An apparatus for producing generative artificial intelligence (AI) output using one or more generative AI models, comprising:

one or more memories storing processor-executable code; and one or more processors coupled with the one or more memories and individually or collectively operable to execute the code to cause the apparatus to:

receive a natural language description of a requested output to be generated by the one or more generative AI models;

generate, with at least one of the one or more generative AI models and based at least in part on the natural language description, a plurality of generation plans, each generation plan comprising a first plurality of instructions for generating the requested output;

rank, with at least one of the one or more generative AI models, the plurality of generation plans to select a candidate generation plan from the plurality of generation plans;

generate, with at least one of the one or more generative AI models and in accordance with the first plurality of instructions comprised in the candidate generation plan, a plurality of outputs;

rank, with at least one of the one or more generative AI models, the plurality of outputs to select a candidate output from the plurality of outputs; and validate the candidate output in accordance with one or more validation parameters associated with the requested output.

12. The apparatus of claim 11, wherein, to generate the plurality of outputs, the one or more processors are individually or collectively further operable to execute the code to cause the apparatus to:

provide a previous successful generation plan, a previously-validated candidate output, or both to the one or more generative AI models.

13. The apparatus of claim 11, wherein, to generate the plurality of outputs, the one or more processors are individually or collectively operable to execute the code to cause the apparatus to:

provide an unsuccessfully-validated output and an indication of an error associated with the unsuccessfully-validated output to the one or more generative AI models.

14. The apparatus of claim 11, wherein each generation plan of the plurality of generation plans comprises natural language instructions for generating the plurality of outputs, context information for generating the plurality of outputs, machine instructions for generating the plurality of outputs, or any combination thereof.

15. The apparatus of claim 11, wherein, to rank the plurality of generation plans to select the candidate generation plan, the one or more processors are individually or collectively operable to execute the code to cause the apparatus to:

provide, to the one or more generative AI models, a ranking request comprising an indication of a ranking system based at least in part on one or more ranking criteria, a natural language request to rank the plurality of generation plans and provide reasoning for one or more generated rankings, and a request output format for presenting generated rankings.

16. The apparatus of claim 11, wherein, to rank the plurality of outputs to select the candidate output, the one or more processors are individually or collectively operable to execute the code to cause the apparatus to:

provide, to the one or more generative AI models, a ranking request comprising an indication of a ranking system based at least in part on one or more ranking criteria, a natural language request to rank the plurality of outputs and provide reasoning for one or more generated rankings, and a requested output format for presenting generated rankings.

17. The apparatus of claim 11, wherein, to generate the plurality of generation plans, the one or more processors are individually or collectively operable to execute the code to cause the apparatus to:

provide, to the one or more generative AI models, a natural language request to generate a second plurality of instructions for generating each generation plan and a requested output format for the plurality of generation plans.

18. The apparatus of claim 11, wherein:

generating the plurality of generation plans is based at least in part on a consensus of the one or more generative AI models; and generating the plurality of outputs is based at least in part on a consensus of the one or more generative AI models.

19. The apparatus of claim 11, wherein:

the requested output comprises a requested cloud substrate security policy; and the candidate output comprises a cloud substrate security policy.

20. A non-transitory computer-readable medium storing code for producing generative artificial intelligence (AI) output using one or more generative AI models, the code comprising instructions executable by one or more processors to:

receive a natural language description of a requested output to be generated by the one or more generative AI models;

generate, with at least one of the one or more generative AI models and based at least in part on the natural language description, a plurality of generation plans, each generation plan comprising a first plurality of instructions for generating the requested output;

rank, with at least one of the one or more generative AI models, the plurality of generation plans to select a candidate generation plan from the plurality of generation plans;

generate, with at least one of the one or more generative AI models and in accordance with the first plurality of instructions comprised in the candidate generation plan, a plurality of outputs;

rank, with at least one of the one or more generative AI models, the plurality of outputs to select a candidate output from the plurality of outputs; and validate the candidate output in accordance with one or more validation parameters associated with the requested output.

* * * * *